(12) United States Patent  
Chianura

(10) Patent No.: US 12,429,372 B2
(45) Date of Patent: Sep. 30, 2025

(54) METHOD TO WEIGH CONTAINERS

(71) Applicant: I.M.A INDUSTRIA MACCHINE AUTOMATICHE S.P.A., Ozzano dell'Emilia (IT)

(72) Inventor: Mattia Chianura, Ozzano dell'Emilia (IT)

(73) Assignee: I.M.A. INDUSTRIA MACCHINE AUTOMATICHE S.P.A., Ozzano dell'Emilia (IT)

(*) Notice: Subject to any disclaimer, the term of this patent is extended or adjusted under 35 U.S.C. 154(b) by 423 days.

(21) Appl. No.: 17/926,241

(22) PCT Filed: May 17, 2021

(86) PCT No.: PCT/IT2021/050146
§ 371 (c)(1),
(2) Date: Nov. 18, 2022

(87) PCT Pub. No.: WO2021/234747
PCT Pub. Date: Nov. 25, 2021

(65) Prior Publication Data
US 2023/0194330 A1 Jun. 22, 2023

(30) Foreign Application Priority Data
May 19, 2020 (IT) .................. 102020000011488

(51) Int. Cl.
*G01G 15/00* (2006.01)
*B65B 1/46* (2006.01)
*G01G 23/16* (2006.01)

(52) U.S. Cl.
CPC ............. *G01G 15/006* (2013.01); *B65B 1/46* (2013.01); *G01G 23/16* (2013.01)

(58) Field of Classification Search
CPC ...... G01G 15/006; G01G 15/04; G01G 17/00; G01G 23/16; B65B 1/46
See application file for complete search history.

(56) References Cited

U.S. PATENT DOCUMENTS

| 5,285,825 | A  | * | 2/1994  | Townsley | G01G 15/006 |
| | | | | | 141/105 |
| 6,148,877 | A  |   | 11/2000 | Bethke | |
| 7,158,916 | B1 | * | 1/2007  | Yarian | G06Q 50/00 |
| | | | | | 235/453 |
| 9,665,933 | B2 | * | 5/2017  | Herrmann | G01N 21/9045 |
| 10,737,810 | B2 | * | 8/2020  | Franke | B65B 3/003 |
| 11,047,727 | B2 | * | 6/2021  | Trebbi | G01G 17/00 |
| 12,181,329 | B2 | * | 12/2024 | Chianura | G01G 15/04 |

(Continued)

OTHER PUBLICATIONS

International Search Report and Written Opinion corresponding to International Patent Application No. PCT/IT2021/050146, mailed Sep. 17, 2021.

*Primary Examiner* — Natalie Huls
(74) *Attorney, Agent, or Firm* — McANDREWS HELD & MALLOY, LTD

(57) ABSTRACT

Method to weigh containers (C) in a processing line (10) that comprises a station (12) for filling and weighing said containers (C), said method providing to simultaneously pick up a plurality of containers (C) which are initially weighed to determine the tare weight and subsequently filled in a sequential manner, determining the weight of product metered into each container (C).

14 Claims, 7 Drawing Sheets

(56) References Cited

U.S. PATENT DOCUMENTS

| | | | |
|---|---|---|---|
| 2005/0060962 A1* | 3/2005 | Rothbauer | B65B 3/003 |
| | | | 53/471 |
| 2015/0034207 A1 | 2/2015 | Boira Bonhora | |
| 2015/0353212 A1 | 12/2015 | Williamson | |
| 2018/0229866 A1* | 8/2018 | Eberhardt | B65B 65/003 |
| 2022/0244090 A1* | 8/2022 | Chianura | B65B 43/46 |
| 2022/0299356 A1* | 9/2022 | Krauss | B65B 3/28 |

* cited by examiner

METHOD TO WEIGH CONTAINERS

FIELD OF THE INVENTION

The present invention concerns a weighing method, able to weigh one or more containers configured to contain products of various kinds, both fluid, solid, and powder, for example drugs, foods or drinks.

The method described here can be carried out at a filling and weighing station of a processing line which can comprise a plurality of other processing stations including, for example, also at least one storage station for the empty containers and a subsequent station for capping or closing the filled containers.

The method described here is suitable to be used, for example, in association with a machine for filling said containers and/or a machine to automatically transport said containers to and from one or more of the processing stations.

The term product or substance means any liquid, semi-solid, gelatinous or solid composition, in which case it can be in powder or in grains, and which can be of plant and/or animal and/or chemical origin.

By way of non-restrictive example only, the method according to the present invention can be used in the fields of pharmaceuticals, cosmetics, healthcare, chemicals and/or food.

BACKGROUND OF THE INVENTION

In the industrial sector of the automated filling of containers, various apparatuses or machines are known, configured as processing lines inside which one or more containers are moved to and from one or more processing stations, advantageously located in succession.

The processing stations may comprise, for example, a storage station for the empty containers, one or more weighing stations, a station for filling the containers, a station for closing each container and a station for packing the filled containers, ready for delivery or for storage in a warehouse of finished products.

One example of a known type of processing line, comprising in sequence a first weighing station for the empty containers, a station for filling the containers by means of a filling unit provided with nozzles to deliver the product, a weighing station for the filled containers, and a station for closing the containers, is described in the United States patent application published with the publication number US-A1-2015/0034207. This known processing line provides to determine the tare weight of the containers to be filled in the first weighing station, and to verify, in the second station for weighing the filled containers, if the weight of the product delivered corresponds to the expected weight, possibly considering a certain range of tolerance. If it is detected that in one or more containers the quantity of product present is lower than that expected, it is provided to move the filling unit, by means of a robotic arm, in correspondence with the second weighing station of the already filled containers. Here, only the nozzle disposed in correspondence with the containers in which the weight of the product is less than expected is selectively activated, to deliver the missing amount of product.

One disadvantage of this processing line is the complexity of the mobile filling unit, which requires flexible pipes to feed the product to the nozzles, as well as peristaltic pumps that can be activated independently to determine the selective delivery of the product only from one or more of the nozzles. The containers in question can be flasks, for example bottles, or in any case containers having a similar or comparable shape and able to contain fluid products, in particular liquids, or solid and powder or gel products.

The movement of the containers between the processing stations, and possibly also inside them, is usually carried out with mechanical and motorized transport devices or apparatuses, which comprise, for example, conveyor belts, turntables or carousels, gears, chains, slides, lifters, mechanical arms, possibly robotic, and other mechanical members.

Irrespective of the type of transport devices used, it is necessary that the containers, which can be at least initially positioned in suitable seatings of a container-holding tray, are picked up by means of suitable pick-up members, individually or in groups, for the subsequent operations of filling, weighing and closing.

The containers are then picked up to be moved to the subsequent processing stations, in particular for filling and weighing.

One of the important aspects in these filling machines is, in fact, the need to weigh the containers before they are filled, after they have been filled and possibly also during the filling step, in order to accurately determine the quantity of product metered into each of them. Furthermore, especially in certain sectors, such as the pharmaceutical one for example, each weighing, to achieve a correct dosage, must be very accurate and precise, with tolerances even in the order of one milligram.

Generally, in this context, a plurality of weighing elements or scales are used, for example load cells, on each of which an empty container is deposited. Typically, metering members are provided, each of which is configured to meter a determinate quantity of product into a respective empty container. In practice, once the tare weight of a container has been measured, the product is metered into it, after which the container thus filled is weighed and, by difference with respect to the tare weight, the net weight of the metered product is determined. This sequence of operations is repeated for all the containers to be processed, whether they are supplied individually or in groups, considerably increasing the process times and reducing the productivity of the filling machine and, overall, of the processing line.

Furthermore, the use of a plurality of weighing elements, each of which is used to weigh both the tare and the gross weight of a specific one of the individual containers, may involve both a multiplication of measurement errors, due to the plurality of weighing elements used, and also a correlated high number of measurement errors and at least the high number of weighing operations to be carried out. A propagation of measurement discrepancies and uncertainty in the exact quantity of metered product may also occur, with particular reference to the accuracy and repeatability of the measurement of the tare and gross weight with the same container, by means of the different weighing elements used.

This aspect is all the more critical, for example, in the pharmaceutical sector or suchlike, where the quantities of the components to be metered are often minimal and the tolerances required are also minimal.

Another aspect to consider is that, often, the containers are supplied in the container-holding tray according to a so-called "quincunx" spatial configuration which provides staggered adjacent rows of containers, to optimize the occupation of the volumes.

This spatial disposition, although it allows to maximize the number of containers disposed in the container-holding tray, makes it difficult to pick them up, so that, in the state of the art, it is possible to pick up only a small number of containers at a time disposed in the same row. This is reflected in the subsequent filling, weighing and closing steps of the picked-up containers, which are carried out only on a small number of containers.

Also this aspect considerably increases the processing times of a given group of containers, since only a few can be moved at a time, reducing the overall productivity. Furthermore, this aspect considerably increases the number of movements, with a consequent increase in energy consumption, greater wear and greater overheating of the motorization units of the movement apparatuses involved.

There is therefore a need to perfect a method to weigh containers in a processing line which can overcome at least one of the disadvantages of the state of the art.

In particular, one purpose of the present invention is to perfect a method to weigh a plurality of containers which reduces the number of possible errors in measuring the weight.

Another purpose of the present invention is to provide a weighing method which is not affected by, or in any case minimizes, uncertainties or differences in weight measurement.

Yet another purpose of the present invention is to provide a weighing method which reduces the process times of a given group of containers.

Yet another purpose of the present invention is to provide a weighing method which minimizes the number of necessary movements.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the present invention or variants to the main inventive idea.

In accordance with the above purposes, some embodiments described here concern a method to weigh containers in a processing line which comprises at least a station for filling and weighing the containers, provided with filling means and weighing means comprising a scale that supports a weighing plate.

The weighing plate is provided with a plurality of positioning seatings, each seating being configured to receive and support a corresponding container.

The method as above comprises the following steps:
picking up a plurality of empty containers from a pick-up station and moving the plurality of containers toward the filling and weighing station;
positioning each container of the containers as above in a respective seating of the plurality of positioning seatings as above;
carrying out a weighing of the total tare weight of the containers inserted in the positioning seatings by means of the scale as above; in particular by weighing all the empty containers initially present in the respective positioning seatings of said weighing plate;
sequentially filling each of said containers with a predetermined dose of product by means of said filling means, wherein this step of sequentially filling is carried out while the plurality of containers remains housed in the positioning seatings of the weighing plate, without displacing the plurality of containers from the scale after the step of carrying out the weighing of the total tare as above;
measuring the weight of the product metered into a first container of the containers as above, subtracting from the total weight determined at the end of the step of filling the first container, the value of the total tare weight previously measured in the step of weighing the tare; and thereafter
measuring the weight of product metered into each container, following the first container, subtracting from the total weight determined at the end of the filling of each container, the value of the total weight measured at the end of the filling of the immediately preceding container.

Advantageously, first of all this method allows to move at once a greater number of containers than those that can be moved with the methods of the state of the art, thus allowing to reduce the number of movements involved, as well as the overall movement times, and increase productivity.

In particular, it is advantageous to reduce the number of movements since this entails, in addition to a reduction in operating times, also lower energy consumption, less wear and less overheating of the motorization units of the movement apparatuses involved. This is all the more advantageous, for example, in the event the movements are carried out by means of automated or robotic apparatuses.

Furthermore, carrying out the weighing of the tare only once, for a given group of containers present in the respective multiple positioning seatings of a weighing plate associated with a specific scale, also reduces errors in measuring the weight of the product metered into each container. This is primarily because a single scale is used to weigh a plurality of containers disposed in the respective positioning seatings of the weighing plate, instead of a plurality of weighing elements, each one dedicated to weighing a single container. In fact, since the net weight of each filling operation is advantageously calculated by the difference between two weight measurements carried out, with the same scale, before and after the specific filling operation, any measurement errors are subtracted instead of being added together as can happen in the state of the art. Furthermore, the number of weighing operations that are performed for a given quantity of containers to be processed is reduced.

Other embodiments also concern a station for filling and weighing containers that comprises container extraction means for extracting a plurality of said containers from a container-holding tray, filling means and weighing means. The weighing means comprise a scale that supports a weighing plate provided with a plurality of positioning seatings, each configured to receive and support a corresponding container. The extraction means as above are configured to move said containers with respect to said filling means and weighing means or, alternatively, there is provided a possible support plate to move said containers with respect to said filling means and weighing means.

According to one embodiment provided here, the station for filling and weighing containers comprises weighing means comprising a scale which supports a weighing plate provided with a plurality of positioning seatings, wherein each positioning seating is configured to receive and support a corresponding container, and filling means configured to sequentially fill each of the containers as above with a product in the filling and weighing station. The latter also comprises a programmable central control unit, operationally connected to the weighing means as above and configured to:

i) first of all, acquire from the scale the measurement of the weighing of the total tare of all the containers of the plurality of containers inserted in the positioning seatings as above, ii) subsequently, drive the filling means to sequentially fill each of the containers as above with a predetermined dose of product while said containers remain housed in the positioning seatings of the weighing plate as above, and iii) once again, subsequently, acquire from the scale the measurement of the weight of product metered into each container by subtracting from the measurement of the total weight obtained for each filling, the measurement of the total weight obtained at the immediately preceding filling, this weight coinciding with the total tare in the event a first container of the plurality of containers as above is filled.

Other further embodiments concern a processing line to process containers comprising a station for storing and picking up the containers and a station for filling and weighing said containers as described here.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention, in order to provide a non-limiting example also in relation the embodiments, the details of the construction, the phraseology and terminology. For example, one or more characteristics shown or described insomuch as they are part of one embodiment can be varied or adopted on, or in association with, other embodiments to produce another embodiment. It is understood that the present invention shall include all such modifications and variants.

The embodiments described here using the attached drawings concern a method to weigh containers C in a line 10 to process containers C, a station 12 for filling and weighing the containers C and a line 10 to process containers C.

Figure 1:
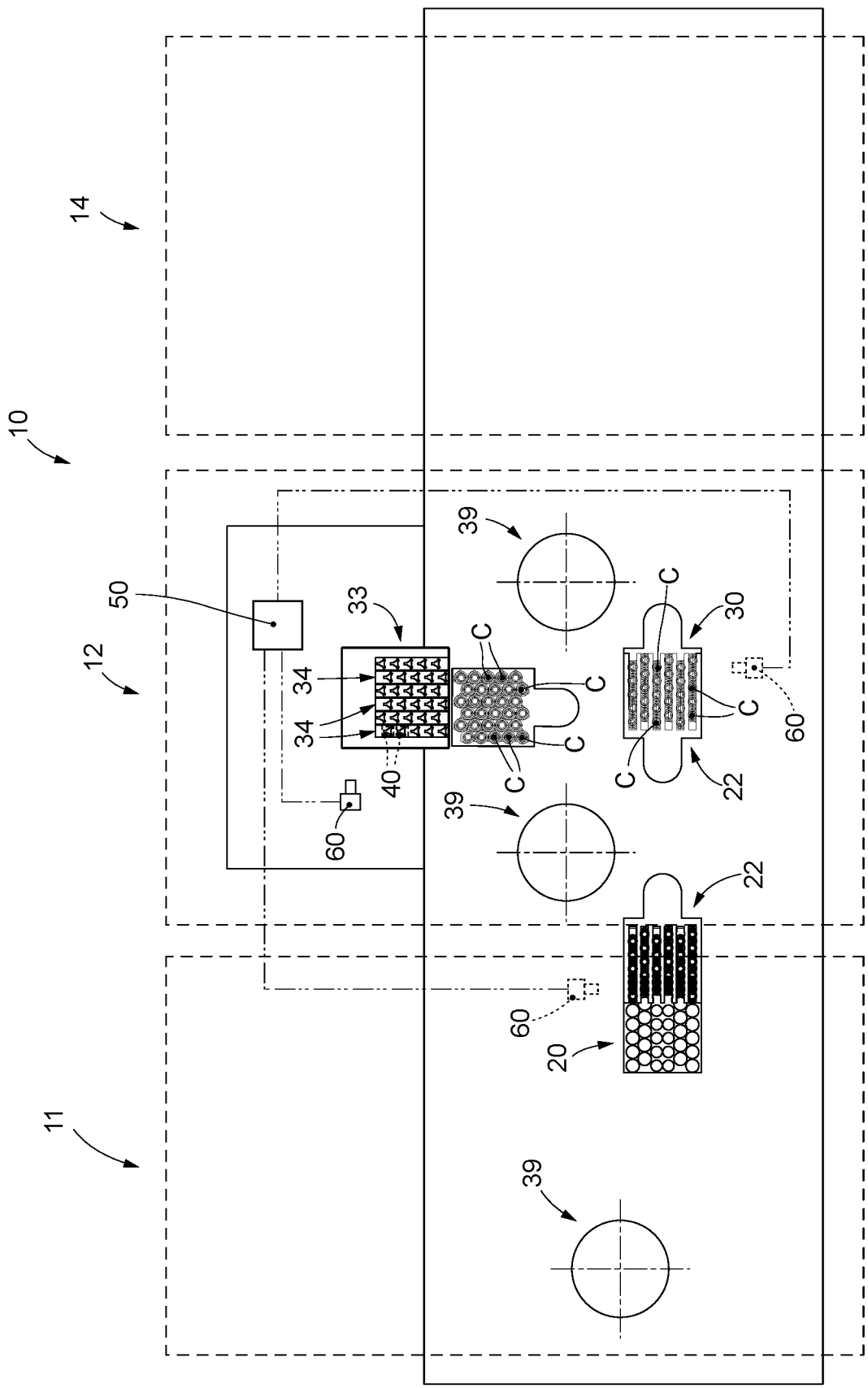
FIG. 1 is a schematic top view of a line to process containers where the method to weigh containers in accordance with some embodiments described here is performed at least between a station for storing and picking the containers and a station for filling and weighing the containers.

The processing line 10 can comprise, in addition to the filling and weighing station 12, also a station 11 for storing and picking up the empty containers and other possible processing stations 14, such as for example a station for closing or capping the containers C, possibly a labeling station, a packaging station or other stations configured to carry out other operations (see for example FIG. 1).

In accordance with possible embodiments, the processing line 10 can also comprise a plurality of movement means 39, schematically shown in FIG. 1. The movement means 39 can be, for example, positioned at least in correspondence with the processing stations 11, 12.

The movement means 39 are configured to move, in space, with respect to the processing stations as above, trays, plates or other devices or means in general, able to support and position, preferentially in a stable and defined manner, a plurality of containers C, described in detail below.

The movement means 39 can, for example, be selected from a group comprising automated movement devices, robotic movement devices, in particular anthropomorphic robots, magnetic or electric movement devices or other known devices or a combination of these devices.

The filling and weighing station 12 can comprise, or be associated with, or remotely connected to, a command and control unit 50 configured to control and manage the functioning at least of said filling and weighing station 12.

For example, the command and control unit 50 can control and command the drive of said movement means 39, in particular in a manner concordant with a work cycle that is pre-set and/or selectable on each occasion, also as a function of the product to be metered and of the batch of containers C to be processed.

We also wish to point out that here and in the present description, the filling and weighing station 12 can be understood as a station in which, in addition to filling, a weighing operation is carried out both before (tare), when the containers are empty, and also after the filling of the containers (gross weight). In this specific case, the overall purpose of the weighing is to detect the net weight of the product which is metered into each of the containers C; typically, the gross weight is measured once the product has been metered into a container C and, since the weight measured before the filling is known, for example of the single container C, it is possible to use this weight measured before the filling as a reference or tare and, on each occasion, calculate by difference, with respect to the gross weight, the net weight of product metered into each container C. This detection of the weight and determination of the net weight of metered product can be managed and controlled by the command and control unit 50, which receives signals correlated to the weight measurements performed.

We also wish to clarify that the expression filling and weighing station 12 used in the present description should not be considered in a limiting sense. For example, this expression can contemplate both the case in which the filling and weighing station 12 is equipped with weighing means and filling means disposed in direct cooperation and proximity with each other, and also the case in which the filling and weighing station 12 provides two zones, or sub-stations, distanced, separated or disposed far away from each other, of which a first one is provided with weighing means for weighing the tare of the containers C and a second one is provided with filling means and weighing means, for filling and weighing the quantity of product metered into each of the containers C.

Figure 2:
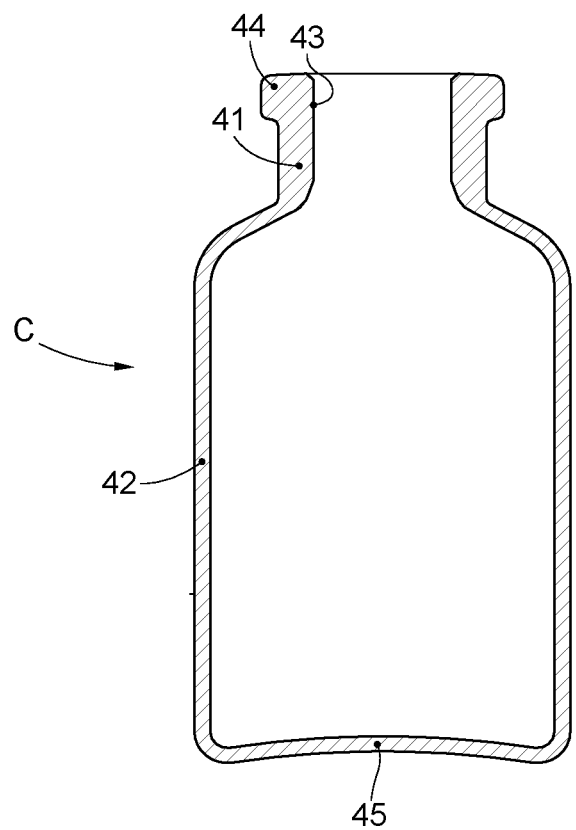
FIG. 2 is a section of a container that can be used in the embodiments described here.

Furthermore, in accordance with some embodiments described here, we will refer, by way of a non-limiting example, to the type of container C better visible for example in FIG. 2, where the container C is configured as a flask or bottle able to contain fluid products, in particular liquids, or solid and powder or gel products. In these possible embodiments, the container C has a neck 41 that projects from a containing body 42, and a mouth 43. The neck 41 has at the upper part, in correspondence with the mouth 43, a protruding annular edge 44, while in an opposite position there is a bottom end 45. It is evident that the containers C can also have other shapes and sizes, possibly even not similar or comparable to that of a flask or bottle.

Figure 3:
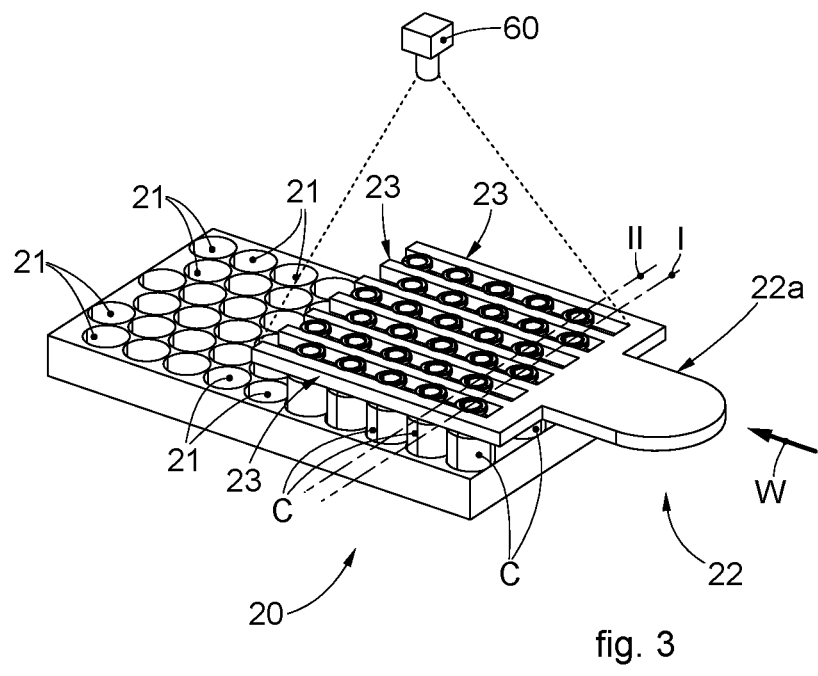
FIG. 3 is a perspective view of a step of cooperation between a container-holding tray and extraction means in the embodiments described here.
Figure 4:
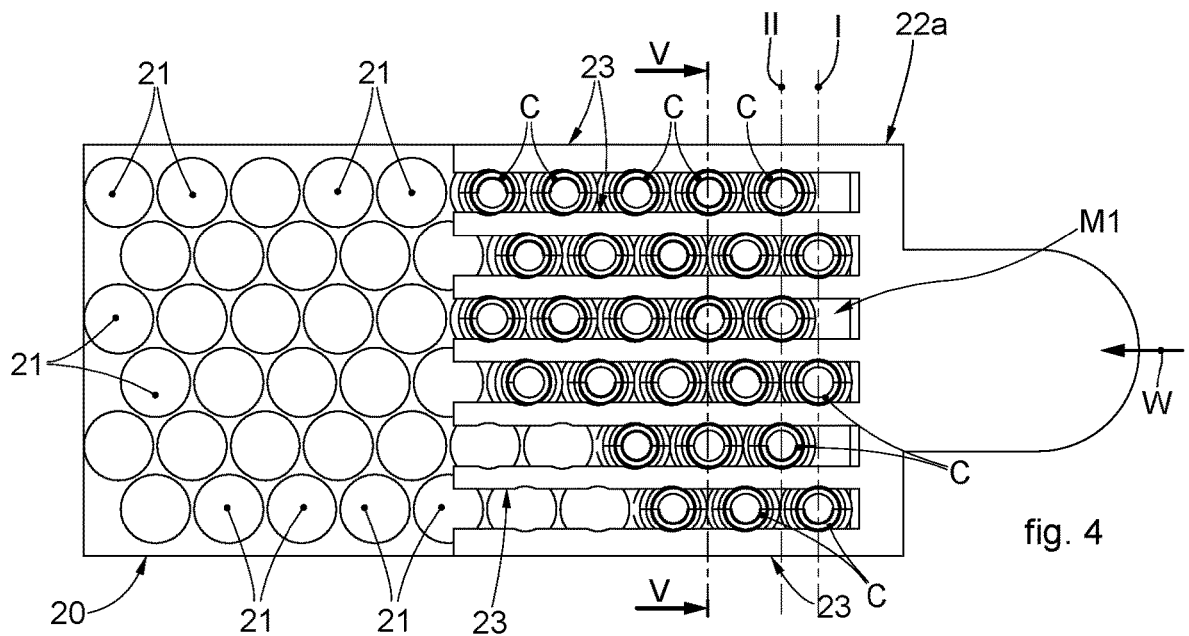
FIG. 4 is a top plan view of a step of cooperation between a container-holding tray and extraction means in the embodiments described here.

In accordance with some embodiments, the method provides to use of a container-holding tray 20 (FIGS. 1, 3 and 4). The latter can be associated with the storage and pick-up station 11 and/or with the filling and weighing station 12 (FIG. 1).

The movement means 39 can be advantageously provided and configured to move the container-holding tray 20.

On the container-holding tray 20 there are pre-positioned a determinate number, even several units or several tens, of empty containers C so as to form an ordered group of containers C according to a positioning matrix M1 (FIG. 3). The positioning matrix M1 is defined for example by a disposition according to a pattern of lines and columns of the containers C in the container-holding tray 20. Here and in the present description, in order to identify lines or columns of the containers C we may also use the term "row" (see for example rows I, II in FIGS. 3 and 4), where by row we mean a succession of elements aligned with each other, in this specific case containers C. This pattern can for example provide that the containers C of one row are offset with respect to those of the two adjacent rows, that is, that one element of one row is disposed in the space between two elements of a subsequent or previous row, so as to optimize the spatial disposition and ensure that the container-holding tray 20 is able to accommodate the highest possible number of containers C. This spatial disposition of containers C, typical of this sector, is also called, in jargon, a "quincunx" disposition.

The container-holding tray 20 is provided with a plurality of housing seatings 21 to receive and position the containers C. The housing seatings 21 are reciprocally disposed according to the configuration of the positioning matrix M1 and are configured to receive and support respective containers C with respect to the bottom end 45 thereof, in particular providing that such containers C have the side of the mouth 43 facing upward.

The container-holding tray 20, and in particular the respective housing seatings 21, can be conformed in various ways.

In one possible example embodiment, the housing seatings 21 can be able to determine a precise and defined space where the containers C can rest, without having any lateral support function for the containers C whatsoever. For example, in the "quincunx" disposition, although the containers C are not positioned in contact, they are very close to each other, self-supporting each other in case of collisions.

Alternatively, in another example embodiment, the housing seatings 21 can be made in the thickness of the container-holding tray 20 and have a depth such as to advantageously allow the lateral support of the containers C when they are positioned therein. For example, the housing seatings 21 can have a circular section in accordance with a substantially cylindrical shape of the containers C. The housing seating 21 can have a slightly larger transverse size than the transverse size of the container C so as to advantageously allow its positioning to be stable, but with some play to facilitate its subsequent pick-up.

We wish to point out here that the containers C are disposed in the container-holding tray 20 in the manner and orientation described above either because they are already supplied in this way, or because they are subjected to an upending operation from an upended condition, with the mouth 43 facing downward, to a condition with the mouth 43 facing upward.

The weighing method described here provides to use of extraction means 22 configured to engage at least a part of the containers C disposed on the container-holding tray 20, in order to extract a plurality of such containers C and transport them and make them available to the filling and weighing station 12. These extraction means 22 can be associated with the storage and pick-up station 11 and/or with the filling and weighing station 12 and/or be mobile at least between such stations.

In some embodiments, the extraction means 22 are configured reciprocally mobile with respect to the container-holding tray 20 in a pick-up direction W (FIGS. 3 and 4), for example on a substantially horizontal plane. According to possible embodiments, this pick-up direction W can be, in particular, transverse, more particularly orthogonal, to a respective row of containers C of the positioning matrix M1. In this specific case, the pick-up direction W can be transverse, more particularly orthogonal, to the perimeter of the container-holding tray 20.

In possible embodiments, the extraction means 22 are conformed to pick up at least two containers C disposed on at least one respective row of the positioning matrix M1.

In other possible embodiments, the extraction means 22 are conformed to pick up, from the container-holding tray 20, at least two containers C disposed on two parallel and consecutive rows I, II of the positioning matrix M1, of which a first container C is positioned in a first row I and a second container C is positioned in a second row II. The first row I is more external, in the positioning matrix M1, with respect to the second row II, referring to the pick-up direction W (see for example FIGS. 3 and 4). In this way, the extraction means 22 first encounter the first container to be picked up and then the second container to be picked up, which is therefore further downstream, when the extraction means 22 move toward the container-holding tray 20 in the pick-up direction W.

According to some embodiments, the extraction means 22 comprise, or are configured as, an extraction gripper 22a as shown for example in FIGS. 3 and 4.

The extraction means 22 can comprise, or be associated with, a specific one of the movement means 39, suitable to move the extraction gripper 22a according to requirements, as explained below. For example, in one embodiment, the extraction means 22 can be associated with movement means configured as an automated robotic arm.

According to possible embodiments, the extraction means 22 are configured to perform at least a first relative movement of engagement with respect to the container-holding tray 20 in order to engage the at least one part of the group of containers C disposed in the housing seatings 21 of the container-holding tray 20, holding the containers C engaged by the extraction gripper 22. In particular, the extraction means 22 are configured to pick up containers C from at least one row of containers C, or from at least two parallel and consecutive rows I, II of containers C. Alternatively, it is not excluded that the first relative movement as above is achieved by moving the container-holding tray 20 with respect to the extraction gripper 22a.

Preferably, the extraction gripper 22a, thanks to its conformation, is able to simultaneously pick up more than one container C, in particular more than two, even more particularly more than three or more, being able to pick up even all the containers C, of one row I and also possibly more than one container C, in particular more than two, even more in particular more than three or more, being able to pick up even all the containers C, of one row II parallel and consecutive to the row I, in order to reduce the processing and movement times, as well as the number of movements. Although here we describe the pick-up from one row, or two rows I, II, it is clear that the present invention can be applied in order to pick up containers C even from more than two rows, for example three, four, five, six or even more than six, and even from all the rows of the container-holding tray 20.

The extraction gripper 22a is configured to also perform at least a second relative movement with respect to the container-holding tray 20 so as to extract the containers C positioned in the housing seatings 21 from the container-holding tray 20, in order to move them to the next processing station, in this specific case to the filling and weighing station 12. In possible implementations, for this purpose the extraction gripper 22a can be moved with a lifting movement, or alternatively the extraction gripper 22a can be kept stationary and the container-holding tray 20 can be moved, in particular with a downward movement.

As described above, the extraction gripper 22a can be moved by means of movement means or devices 39 associated with it, which allow both a relative movement of it with respect to the containers C to be engaged and picked up, in the event that the extraction gripper 22a is moved with respect to the container-holding tray 20, and also a movement in space in order to reach the filling and weighing station 12 of the containers C.

In accordance with some embodiments, at least in the first relative movement of engagement as above, the extraction gripper 22a is configured to be operationally aligned with respect to the rows, lines or columns, of the positioning matrix M1 of the container-holding tray 20 so as to accommodate inside it respective rows of containers C, as shown in FIG. 4.

In some embodiments, the filling and weighing station 12 comprises weighing means 33, described in detail below (FIGS. 8-14).

Figure 8:
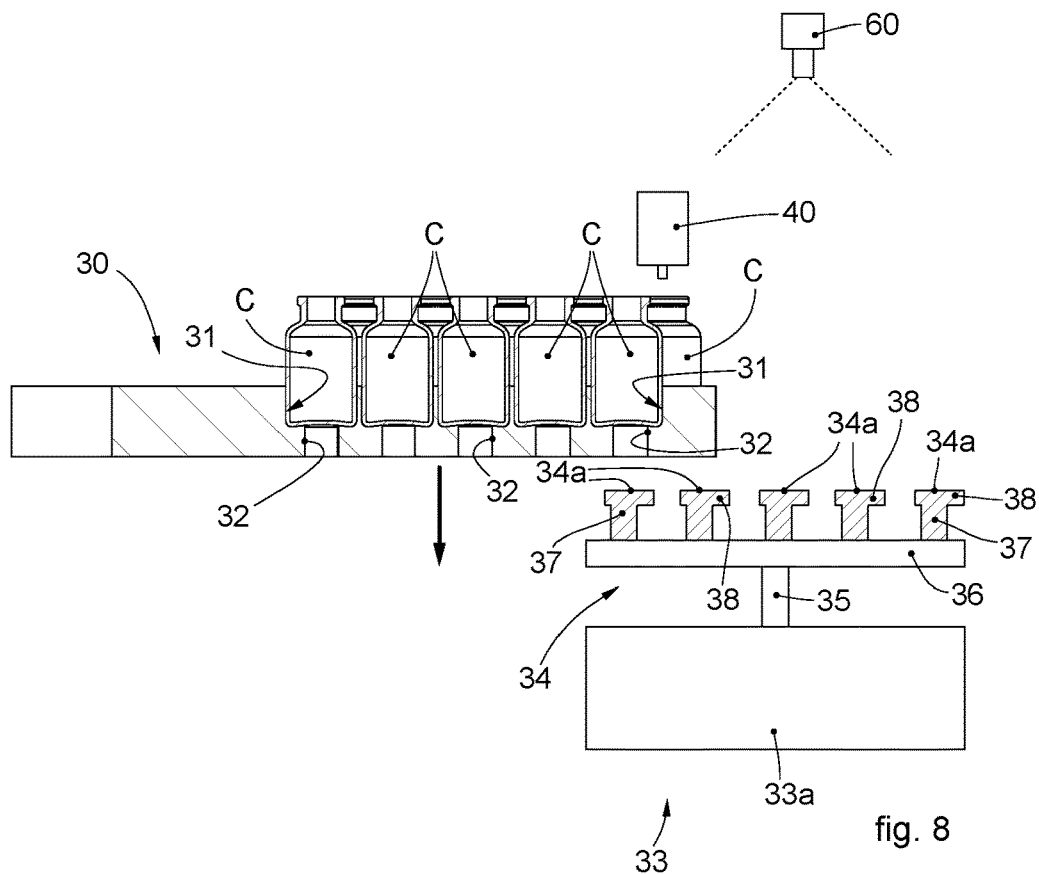
FIG. 8 is a schematic section of a step of the weighing method according to some embodiments described here.
Figure 9:
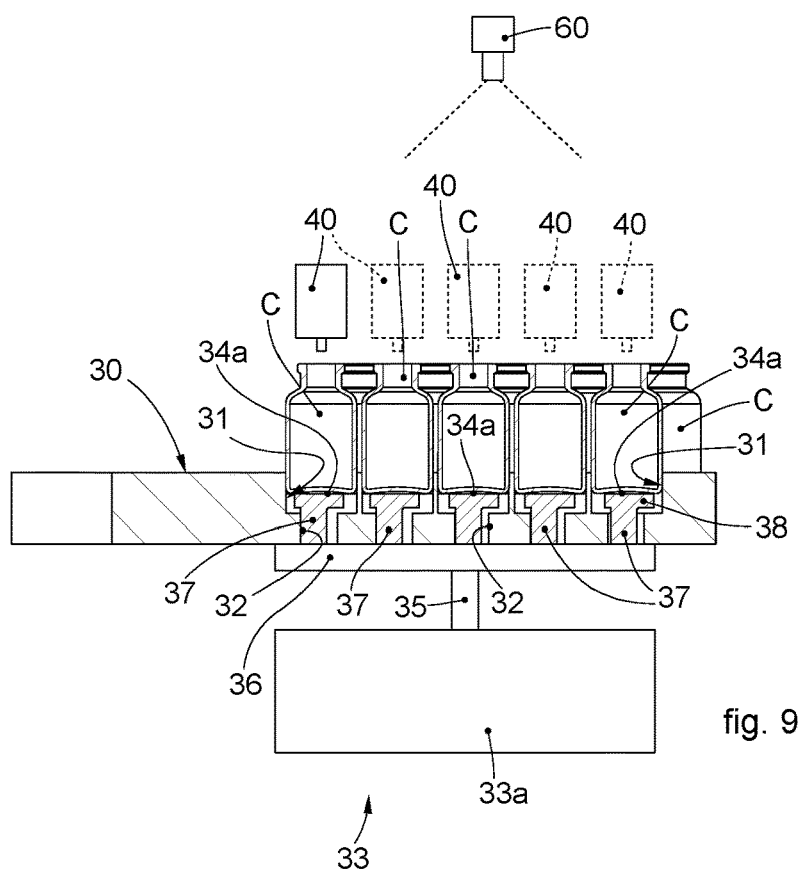
FIG. 9 is a schematic section of another step of the weighing method according to some embodiments described here.

Furthermore, the filling and weighing station 12 can comprise filling means 40, configured to fill each of the containers C, schematically represented in FIG. 1 and visible also in FIGS. 8 and 9, with metered quantities. The filling means 40 can be, for example, nozzles or similar delivery or metering devices.

For example, the filling means 40 can be a single delivery or metering device in a fixed position, or an array of delivery or metering devices disposed in fixed positions, or one or more delivery devices positioned mobile, so as to move in correspondence with the respective containers C to be filled. For example, by way of example FIG. 8 shows a filling means 40 and FIG. 9 shows a filling mean 40 with a solid line and a possible plurality of filling means 40 with a dashed line.

Furthermore, although the filling means 40 are shown in FIGS. 1, 8, 9, as an example, substantially corresponding with the weighing means 33, so that in fact a same container C is static at least with respect to the weighing means 33 during the operations of weighing the tare, filling and weighing the gross weight, the present invention can also contemplate embodiments in which, always within the context of the filling and weighing station 12 as defined in the present description, the filling means 40 are positioned distanced and/or remote with respect to the weighing means 33 used for example to carry out the weighing of the tare and, therefore, a same container C can be moved with respect to weighing means 33 provided to weigh the tare, and with respect to filling means 40 and weighing means 33 to weigh the gross weight and therefore obtain the net weight of metered product.

For example, there can be provided autonomous weighing means 33 distanced from the filling means 40 and, once the tare of the containers C has been weighed only once as described here, the same containers C can be moved in correspondence with the filling means 40 where a quantity of product is metered into a specific container C.

The latter are subsequently moved to the weighing means 33, where the gross weight of the specific container C filled is weighed, from which the net weight is obtained. Subsequently, the containers C are moved again to the filling means 40, where another filling of another container C is carried out. Finally, the containers C are once again moved to the weighing means 33, where the gross weight of the specific other filled container C is weighed, proceeding progressively in this manner until all the containers of a given group of containers C are filled and weighed.

Advantageously, in all the embodiments described here, the weighing means 33 and the filling means 40 can be managed and controlled by the command and control unit 50, also in relation to the reciprocal operations. The command and control unit 50 can coordinate the movement of the plurality of containers C according to the methods described here, also in relation to the various operations, and to their specific sequence, which are carried out at the filling and weighing station 12 and in particular by means of filling means 40 and the weighing means 33.

In accordance with possible embodiments, the filling and weighing station 12 can also comprise, or be associated or in cooperation with, support means, in particular a support plate 30, configured to receive the containers C from the extraction means 22, in this specific case from the extraction gripper 22a, and to support the containers C at least during the filling and weighing operation.

The movement means 39 can also be provided to move the support plate 30, if provided or used.

According to embodiments in which the support means are configured as a support plate 30, the latter is provided with a plurality of support seatings 31 reciprocally disposed according to the configuration defined by the positioning matrix M1, in order to receive the group of containers C moved by the extraction gripper 22a.

In the embodiments in which it is provided to use the support plate 30 as a means for making the containers C cooperate with the filling means 40 and the weighing means 33, each support seating 31 has, on the bottom surface, a shaped aperture 32 to allow the cooperation with the weighing means 33 which will be described in detail below (see for example FIGS. 8-11).

In the embodiments that contemplate using the support plate 30, the extraction gripper 22a carries out a first movement of alignment with respect to the support plate 30 so as to vertically align the containers C with the underlying support seatings 31 with respect to the positioning matrix M1. Furthermore, the extraction gripper 22a is configured to also carry out a second movement, moving downward, so that the containers C are inserted in the support seatings 31 (FIG. 6), and then retract, essentially with an opposite movement to the previous one, so as to disengage the containers C which therefore remain accommodated by the support seatings 31 of the support plate 30. Alternatively, it is also possible for the support plate 30 to be moved with respect to the extraction gripper 22a.

The support seatings 31 can be made in the thickness of the support plate 30 and have a depth such as to allow the lateral support of the containers C when they are positioned therein. In the example described here, the support seatings 31 have a circular section in accordance with a substantially cylindrical shape of the containers C. The support seating 31 can have a transverse size slightly larger than the transverse size of the container C, so as to allow its positioning to be stable, but with some play to facilitate its subsequent pick-up.

Figure 7:
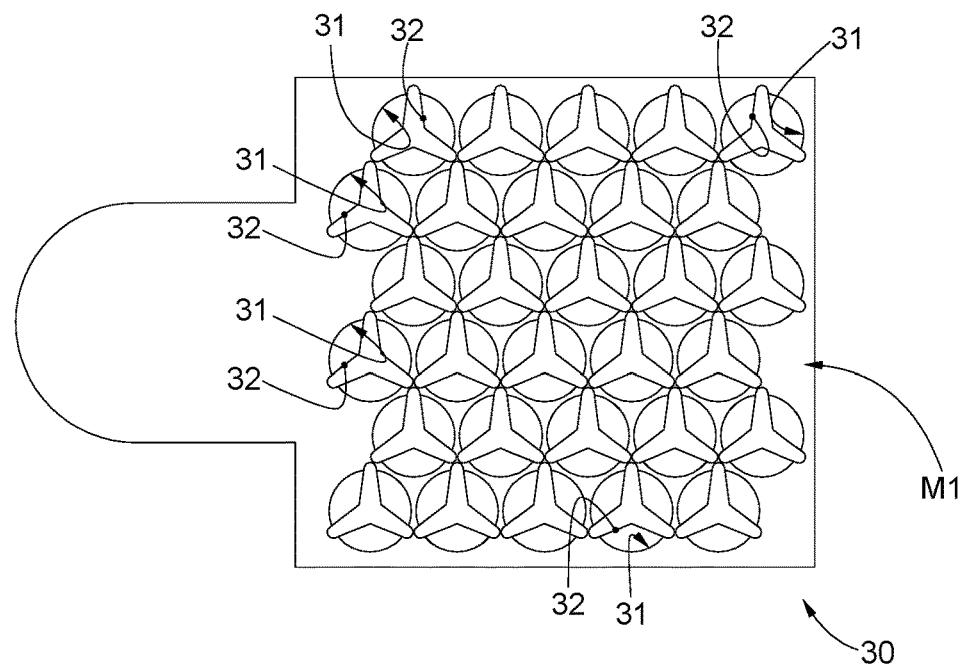
FIG. 7 is a top view of a support plate according to some embodiments described here.

As stated, in the embodiments in which it is provided to use the support plate 30 as a movement mean, in order to make the containers C cooperate with the filling means 40 and the weighing means 33 of the filling and weighing station 12, as described in detail below, each support seating 31 has, on the bottom surface, a shaped aperture 32 (FIGS. 7, 8, 9) to allow the cooperation with the weighing means 33, which are also suitably shaped, FIGS. 8, 9, 10, 11. For example, the shaped aperture 32 can have a conformation in which three angled arms depart from a central zone, for example the arms being equally angled by about 120° with respect to each other, in particular being able to assume the shape of a three-pointed star.

In some embodiments, which can be combined with all the embodiments described here, the weighing means 33 (FIGS. 8, 9, 10, 11, 12, 13, 14) comprise at least one scale 33a and a respective weighing plate 34 associated with the at least one scale 33a. The at least one scale 33a can comprise, for example, a load cell or other weight detector. A respective weighing plate 34 is mounted on the at least one scale 33a having a plurality of positioning seatings 34a. In this way, the method therefore provides to weigh a plurality of containers C supported by a same weighing plate 34 by means of the associated scale 33a (FIGS. 8, 9, 10, 11, 12, 13, 14).

In some embodiments, therefore, the weighing method and the connected filling and weighing station 12 are able to weigh the tare of the containers C initially when they are empty and, subsequently, measure the gross weight, when a container C has been filled. In particular, the total tare is weighed only once for a plurality of containers C positioned in the positioning seatings 34a of the weighing plate 34 of a scale 33a, after which the containers C are filled one by one and, for each filling, the net weight of metered product is obtained by difference with respect to the gross weight detected in the previous filling, with the exception of the first filling, where the difference is calculated with respect to the single weighing of the tare as above.

In particular, in the embodiments described using FIGS. 7, 8, 9, 10, 11, 12, 13, 14 and which can be combined with all the embodiments described here, each of the positioning seatings 34a is advantageously conformed to position, preferably in a stable manner, a respective container C, for the purpose of weighing the metered quantity of product which is introduced by the filling means 40.

The weighing means 33 can include one or more scales 33a of the type described here. For example, the weighing means 33 can include a single scale 33a, which supports the weighing plate 34 with multiple positioning seatings 34a, or they can include a plurality of such scales 33a, each equipped with a weighing plate 34 having multiple positioning seatings 34a.

In some embodiments, it is possible to provide that there is one or more than one filling means 40 for each scale 33a, but in any case, fewer than the number of the respective positioning seatings 34a of the respective scale 33a. In this case, such one or more filling means 40 can be mobile with at least two degrees of freedom, that is, at least lateral displacement and lifting/lowering, in order to serve the plurality of positioning seatings 34a of the respective scale 33a. Alternatively, a plurality of filling means 40 can be provided for each scale 33a in a number equal to the number of the respective positioning seatings 34a and, in this case, the filling means 40 can be mobile with one degree of freedom, that is, lifting/lowering.

We wish to point out here that, according to the present invention, the extraction means 22, or alternatively the support plate 30 or possibly other means able to pick up the plurality of containers C, can pick up a plurality of containers C, whether they belong to a single row or multiple rows of the container-holding tray 20, the number of which is equal to or greater than, favorably a multiple of, the number of scales 33a and filling means 40 provided, favorably a multiple.

In the embodiments described using FIGS. 8-14, the number of positioning seatings 34a for each weighing plate 34 can advantageously be two or more, for example three, four, five, six or even more than six. These positioning seatings 34a, based on their number and operational requirements, can also be disposed on several consecutive rows, each row being able to provide in this case two or more positioning seatings 34a, for example three, four, five, six or even more than six.

As described above, the weighing method can provide to move the containers C by means of the support plate 30 or directly by means of the extraction means 22, by means of which the containers C have been picked up from the container-holding tray 20, or other suitable pick-up and movement means. In the possible variants, the mode by means of which the containers C are supported can change, for example they can be supported on the bottom 45 thanks to the support seatings 31 of the support plate 30, or kept suspended from above, by holding the protruding annular edge 44 of the neck 41 with to the extraction gripper 22a. This different support mode can also imply a different conformation of the weighing plate 34 used, and in particular how the plurality of positioning seatings 34a are made or defined, so that they are compatible respectively with the conformation of the support plate 30 or of the extraction gripper 22a or other pick-up and movement means.

Figure 10:
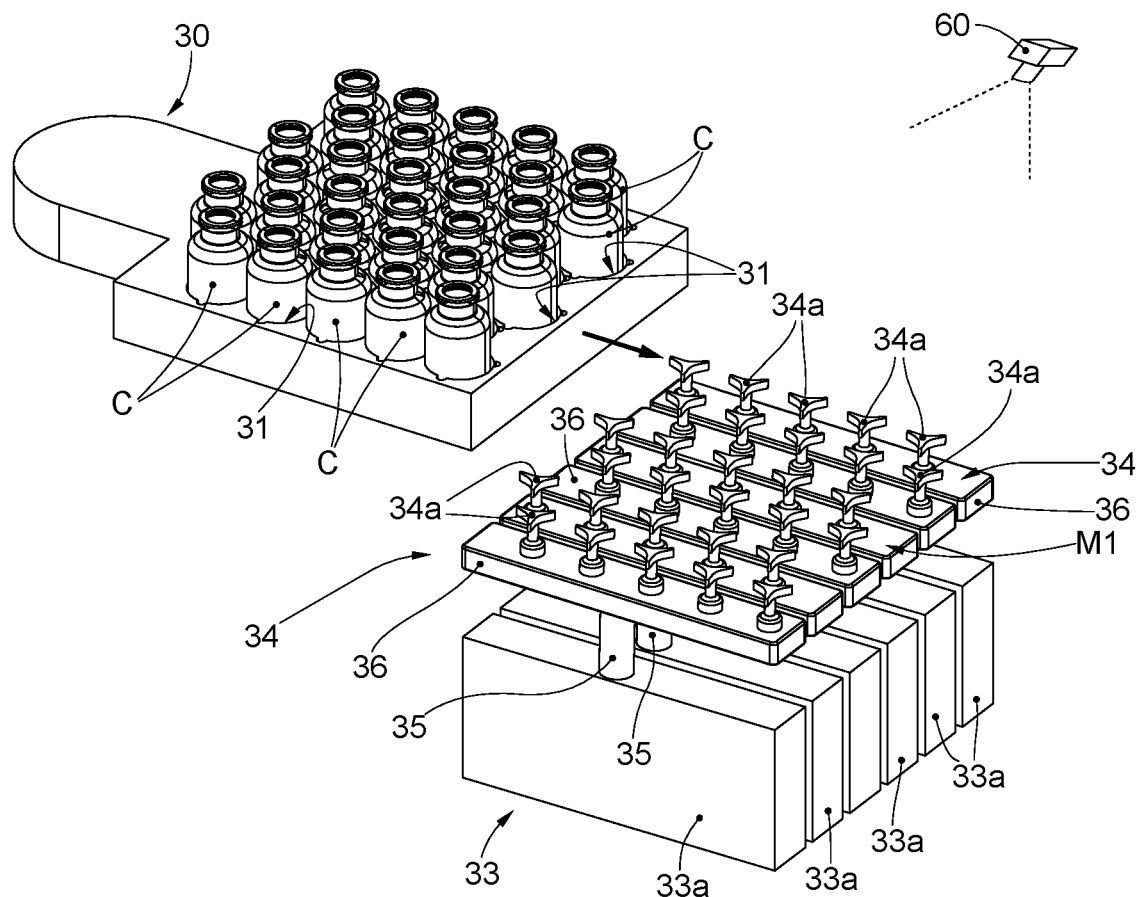
FIG. 10 is a perspective view of a support plate according to some embodiments described here, on which containers are positioned, in cooperation with weighing means according to some embodiments described here.

In particular, FIGS. 8, 9, 10 are used to describe embodiments in which the support plate 30 positions containers C with respect to filling means 40 and also with respect to weighing means 33 equipped with suitable weighing plates 34 described with reference to FIGS. 8-11. Alternatively, for this purpose it is also possible to directly use the extraction means 22, in this case using for example weighing plates 34 described with reference to FIGS. 12-15. According to another alternative, it is also possible to use other pick-up and movement means, for example of the vacuum type, such as suckers or suchlike.

In any case, the advantages are evident of being able to pick up and move a plurality of containers C which are then subjected to filling and weighing by means of the weighing means 33 provided with scales 33a with a weighing plate 34 having a plurality of positioning seatings 34a: it is possible, in fact, to reduce the number of weight measurement errors, since both the number of weighing operations and also the number of scales 33a used is reduced, since it is possible to use even a single scale 33a equipped with the weighing plate 34 described here for a given plurality of containers C. Furthermore, it is possible to eliminate or reduce uncertainties or discrepancies in the measurement of the tare weight and therefore of the weight of the metered product, reduce the processing times of a given group of containers and minimize the number of necessary movements.

For example, FIGS. 8, 9, 10 show, by way of example, some embodiments in which the support plate 30 positions containers C with respect to the filling means 40 (shown only in FIGS. 9 and 10) and in association with the weighing means 33. In this case, the support plate 30 can also be used to support the containers C during the weighing operation carried out by the weighing means 33 present therein.

In this case, the embodiments of the weighing plate 34 described using FIGS. 8, 9, 10, 11 can be advantageously used in association with the support plate 30. In particular, in these embodiments the weighing plate 34 has a support shank 35 supporting at one end thereof a positioning plate 36, in particular disposed transverse to the support shank 35. The positioning seatings 34a are provided on the positioning plate 36. The support shank 35 is mounted on, or connected to, a respective scale 33a.

In these embodiments, a plurality of rods 37 project from the positioning plate 36, which each support a suitably shaped support element 38. Each support element 38 has an upper surface that defines a respective positioning seating 34a. The support elements 38 are advantageously conformed or shaped in a manner mating with the shape of the apertures 32 of the support plate 30. In possible implementations, the support elements 38 can be shaped as radial arms, for example three as in FIGS. 8-11.

In particular, in these embodiments, thanks to the fact that the support elements 38 project, supported by the respective rods 37, from the positioning plate 36, it is possible to make the support elements 38 selectively pass through the apertures 32 of the support plate 30 so that each container C can be positioned, preferably in a stable manner, on the respective positioning seating 34a.

In other embodiments, not shown but the implementation of which is easily understandable by a person of skill in the art, the support plate 30 is not used and the extraction means 22, in particular the extraction gripper 22a, directly position the containers C with respect to the filling means 40 and in association with the weighing means 33. In this case, the extraction means 22, in particular the extraction gripper 22a, can also be used to support the containers C during the weighing operation performed by the weighing means 33 present therein.

Figure 11:
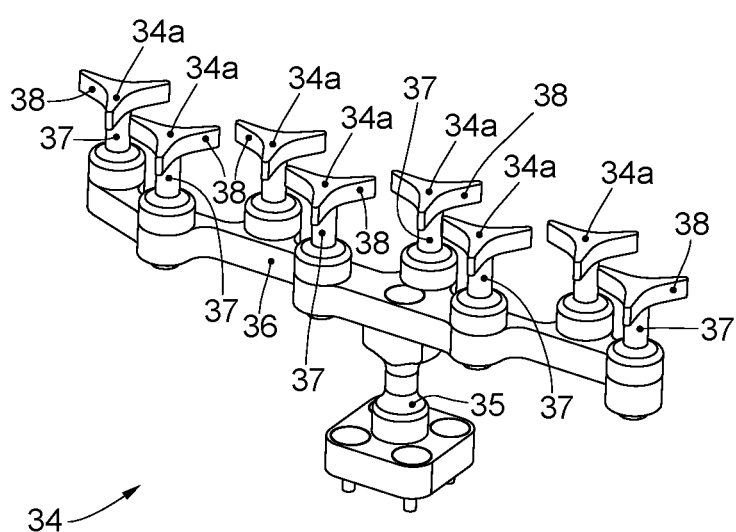
FIG. 11 is a perspective view of a weighing plate according to some embodiments described here.
Figure 12:
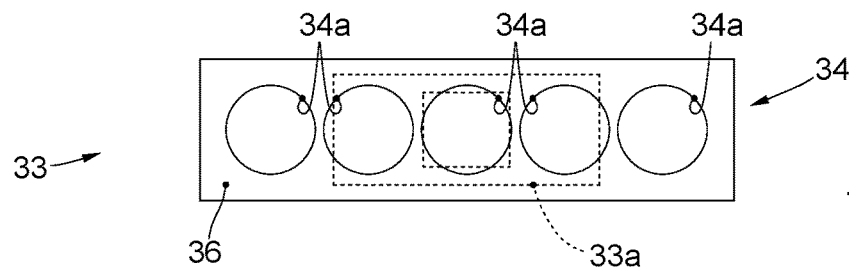
FIG. 12 is a schematic top plan view of weighing means according to some embodiments described here.
Figure 13:
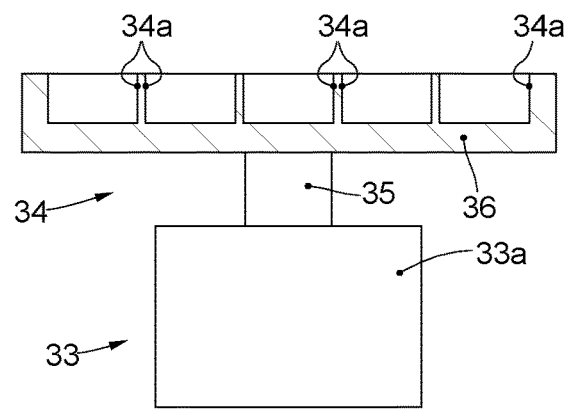
FIG. 13 is a partly sectioned schematic lateral view of weighing means according to some embodiments described here.
Figure 14:
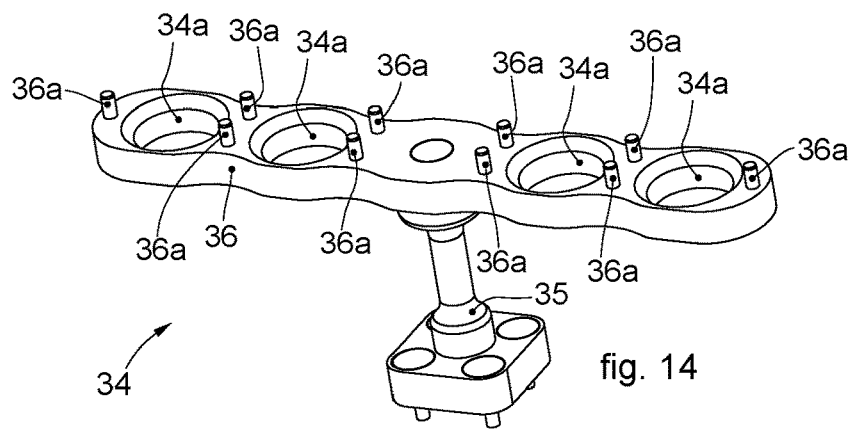
FIG. 14 is a perspective view of a weighing plate according to other embodiments described here.

In this further case, therefore, the embodiments of the weighing plate 34 described using FIGS. 12, 13, 14 can be advantageously used in association with the extraction means 22, in particular the extraction gripper 22a. With regard to these embodiments, here we describe only the differences with respect to the weighing plate 34 of the embodiments of FIGS. 8-11 while the other parts or components are the same, unless otherwise specified. Therefore, in these embodiments there are no support elements 38 supported by rods 37 projecting from the positioning plate 36, but the positioning plate 36 has a plurality of positioning seatings 34a, which are made hollow or recessed in the positioning plate 36.

In particular, in these embodiments, the containers C carried by the extraction means 22 can be freely inserted into the respective positioning seatings 34a from above, being partly accommodated inside them and resting on their bottom, preferably in a stable manner.

In some embodiments, described using FIG. 14 and which can also be combined with the embodiments of FIGS. 8-11 and 12-13, the weighing plate 34 can have a plurality of protruding pegs 36a, disposed in correspondence with each positioning seating 34a. Advantageously, the disposition and conformation of the pegs 36a is aimed at having a function of centering and radial containing of the containers C positioned in the respective positioning seatings 34a. The pegs 36a can for example protrude from the corresponding weighing plate 36 and be disposed around each positioning seating 34a, as shown by way of example in FIG. 14 and as is also possible in the embodiments described with reference to FIGS. 12 and 13.

As stated, the presence of the pegs 36a, with the same functions as above, can also be provided in the embodiments of FIGS. 9, 10, 11. In this case, the pegs 36a project from each of the respective support elements 38, in fact being disposed around the respective positioning seatings 34a. For example, in the case in which the support elements 38 are shaped as radial arms, the pegs 36a can be provided at the ends of each radial arm.

Furthermore, in the embodiments described using FIGS. 12, 13, 14, the positioning seatings 34a of a respective weighing plate 34 are for example disposed aligned with each other; however, we do not exclude that the positioning seatings 34a can also be disposed with an offset or alternating spatial configuration, for example as a "quincunx" as in FIGS. 8, 9, 10, 11, or other spatial configuration or orientation. For example, as can be seen in FIG. 11, the positioning plate 36 can be suitably shaped in a manner mating with the desired disposition, in this case a "quincunx". Depending on the disposition of the multiple positioning seatings 34a provided in the weighing plate 34 described using FIGS. 8, 9, 10, 11, 12, 13, 14, the support plate 30 that carries the containers C, or the extraction gripper 22a if the support plate 30 is not used, is suitably moved with respect to the weighing means 33, so that there is coordination and alignment between the containers C and the multiple positioning seatings 34a.

In accordance with some embodiments of the weighing method described here, using the support plate 30 or alternatively directly the extraction gripper 22a, or other suitable pick-up and movement means, a plurality of containers C are positioned simultaneously in each of the seatings positioning 34a of the weighing plate 34 of a respective scale 33a of the weighing means 33.

For example, the multiple positioning seatings 34a of each weighing plate 34 can be disposed so as to cooperate, for weighing purposes, with one, two or more rows of containers C supplied by the support plate 30, without being extracted from the respective support seating 31 in which they are housed, or alternatively supplied by the same extraction grippers 22a.

In the embodiments described here, see for example FIGS. 8-11, and also being valid in the case in which, as an alternative to the support plate 30, the extraction means 22 with reference to FIGS. 12-14 are used instead, the support plate 30 is configured to perform at least a first movement of alignment with respect to the weighing means 33 so as to vertically align the shaped apertures 32 with the positioning seatings 34a of each of the weighing plates 34 with respect to the positioning matrix M1, FIG. 8. In this case, the weighing plate 34 described using FIGS. 8-11 is used, where advantageously the projecting support elements 38, which each have the respective positioning seatings 34a, are mating with the respective shaped apertures 32 so that the support elements 38 can pass through them. Furthermore, the support plate 30 is configured to also perform a second movement, which in this case involves the passage of the support elements 38 and corresponding positioning seatings 34a through the apertures 32, so that the containers C are deposited, thanks to the presence of the apertures 32, each one in a respective positioning seating 34a (FIG. 9), to then rise again so as to disengage the support elements 38 and remove the containers C from the respective positioning seatings 34a.

In the case of the embodiments of FIGS. 8-11, and also being valid for the embodiments of FIGS. 12-14, by suitably using the extraction means 22 instead of the support plate 30, this sequence of movements is repeated, making the support plate 30 progressively advance in a stepwise manner, coordinated with the distance between the rows of containers C and the positioning seatings 34a, with respect to the weighing means 33, to cause all the containers C present on the support plate 30 to be progressively deposited in the respective positioning seatings 34a. Here, the tare of the group of containers C present on the weighing plate 34 is weighed one time, after which the filling is carried out for each container C. At the end of each operation of filling a specific container C, the total weight of the containers C present on the weighing plate 34 is measured and, based on the difference with respect to the weight measured in the previous step, which initially is the tare weight of the containers C and in the following steps is, on the other hand, the gross weight measured in the previous filling, the net weight of product metered into the specific container C is calculated. In other advantageous embodiments, it is also possible that the sequence of movements described above is performed only once, since, thanks to the presence, on respective weighing plates 34, of a total number of multiple positioning seatings 34a at least equal to the number of containers C, it is possible to weigh the tare of all the containers C present on the support plate 30 or on the extraction means 22 at the same time, so as to then proceed with the sequential filling and weighing of the quantity of product metered into all containers C inserted in the positioning seatings 34a. With each filling, based on the difference with the tare weight determined initially, in the case of the first filling, or with the gross weight detected in the previous filling, it is possible to determine on each occasion the net weight of product metered into each container C. This determination can be advantageously carried out by the command and control unit 50.

In the embodiments described here it is provided, in particular, to carry out an operation of weighing the tare only once for all the containers C which are disposed in the respective multiple positioning seatings 34a of a weighing plate 34 and therefore, by moving a greater number of containers C at a time, it is advantageously possible to reduce the number of times that the weighing of the tare of the containers C is carried out, or to use a smaller number of scales 33a to process the weighing operations of a multiplicity of containers C.

In particular, by means of the weighing means 33, in which each scale 33a is provided with a specific weighing plate 34 having a plurality of positioning seatings 34a according to the embodiments described here, it is advantageously possible to make the step of weighing the tare quicker and more accurate and, therefore, significantly increase the productivity and precision of the weighing procedure and consequently of the entire processing cycle.

In fact, by means of the weighing plate 34 provided with a plurality of positioning seatings 34a, it is possible to position a plurality of containers C supported by the weighing plate 34 associated with the respective scale 33a and to weigh the tare of all such containers C only once, at the beginning of the weighing cycle of a determinate group of containers C.

Figure 15:
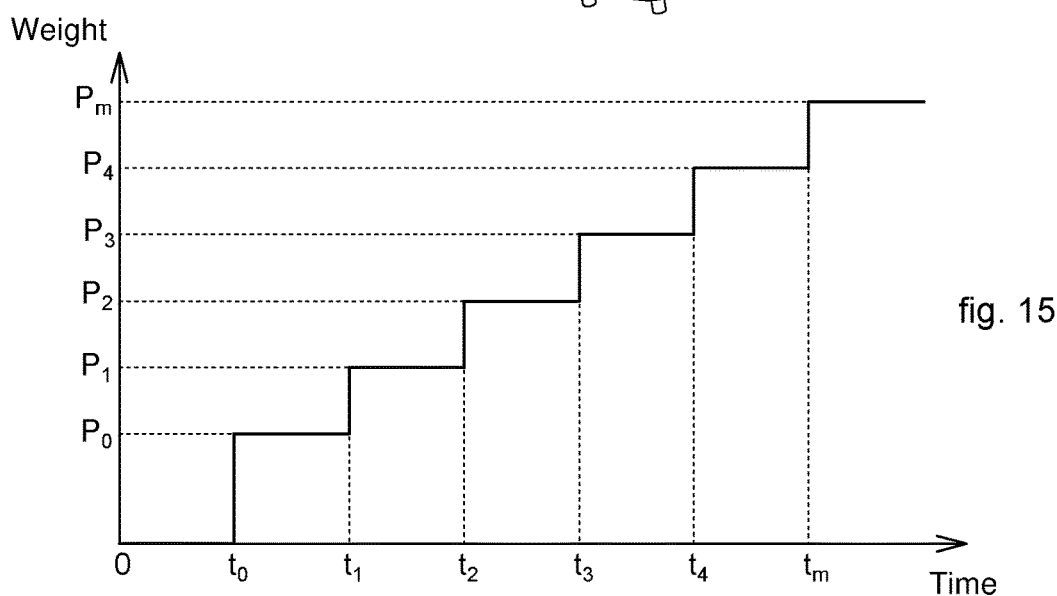
FIG. 15 is a graph that shows the trend over time (x axis) of the weight (y axis) detected by weighing means according to some embodiments described here.

With reference also to FIG. 15, which shows a graph of the trend over time (x axis) of the weight (y axis) progressively detected by the scale 33a, it is possible to see that at time t0, when for example all the containers C are positioned in their respective positioning seatings 34a and are empty, that is, before the filling, the weight detected by the scale 33a at time to represents the weight of all the empty containers C, that is, the tare weight, or in any case of the reference value, or zero. This tare weight is the initial weight value with respect to which the subsequent operation of weighing the first container C which is filled by means of the filling means 40 refers. In the graph of FIG. 15 the tare weight is indicated by P0, at the instant of time to.

Subsequently, at the time t1 a quantity of product is metered into one of the containers C and a weight P1 is detected, after which at time t2 a quantity of product is metered into another one of the containers C and a weight P2 is detected, and so on, repeating these weight measurements incrementally for a number "m" of times equal to the number of positioning seatings 34a of each weighing plate 34, that is, equal to the number of containers C to be filled and weighed on a same scale 33a.

With the exception of the first weight detected, before the start of the filling, which is the tare weight of all the "m" containers C present in the positioning seatings 34a of each weighing plate 34 associated with a respective scale 33a, all the weights detected subsequently are gross weights, as a result of the sequential metering of product into each container C. Therefore, for example, the net weight of the product metered into the first container C which is filled will be given by the difference between the gross weight P1 detected and the tare weight P0 detected initially, while the net weight of the product metered into the second container C which is filled will be given by the difference between the gross weight P2 detected and the previous gross weight P1, and so on. It is therefore possible to state that the gross weight detected in a given weighing operation, subsequent to the first operation of weighing the tare when the containers C are empty, in fact represents the reference weight with respect to which, in a subsequent operation of weighing the gross weight, the net weight of product metered in that given subsequent operation is calculated.

Therefore, in some embodiments, the weight of product metered into a container C is determined by measuring the difference between the weight detected by the scale 33a at the first filling and the total tare weight of the containers C initially detected by the scale 33a and, subsequently, by measuring the difference between the weight detected at another filling by the scale 33a and the weight detected by the scale 33a at the immediately preceding filling.

In general, therefore, the net weight N(i+1) of product metered into a given container C at the instant of time i+1 by the filling means 40 will be defined by the difference between the current weight P(i+1) detected by the scale 33a and the total weight P(i) detected by the same scale 33a at a previous filling carried out at the time i:

$$N(i+1)=P(i+1)-P(i)$$

where i is a natural number ranging from 0 to m and m is the number of containers C which are disposed and supported in the positioning seatings 34a of the respective weighing plate 34 associated with a scale 33a.

As a consequence of what has been described above, therefore, the graph of FIG. 15 can therefore be considered a "step-shaped" graph of the weight with respect to time, where each step represents an increase in weight detected by the scale 33a and the entity of each step actually corresponds to the net weight of product metered in the specific filling; it can therefore be stated that the weighing method described here is a "step-type" weighing method.

In some embodiments, therefore, the weighing method provides to:
  simultaneously pick up a plurality of empty containers C from a container-holding tray 20 and move the plurality of containers C toward the filling and weighing station 12 in order to cooperate with the filling means 40 and the weighing means 33;
  position, by means of the extraction means 22 or by means of the support plate 30 into which the containers C have been transferred by the extraction means 22, a plurality of empty containers C in the positioning seatings 34a of each weighing plate 34 associated with a respective scale 33a, so that each container C is positioned, preferably in a stable manner, in a specific positioning seating 34a of the respective weighing plate 34;
  carry out a weighing of the tare only once, weighing all the empty containers C initially present in the respective positioning seatings 34a of the weighing plate 34,
  sequentially fill each of the containers C, progressively determining the weight of product metered into a specific container C by means of the scale 33a, at each filling step, that is, after each filling step, without carrying out the weighing of the tare of each container for the given group of containers C to fill and weigh.

As stated above, the pick-up step can be carried out by an automated robotic arm.

According to some embodiments of the method described here, the step of filling sequentially provides to activate the filling means 40 to deliver the predetermined dose of product until a pre-established weight measured by the scale 33a is reached; the delivery of the product into each container of the plurality of containers C is interrupted when the pre-established weight is reached.

If the weighing means 33 comprise a plurality of scales 33a, the steps of carrying out the weighing of the tare only once and of sequentially filling and weighing the containers C of each weighing plate 34 can advantageously occur in parallel for each of the scales 33a provided.

As indicated above, for the purposes of determining the weight of product metered into a specific container C by means of the scale 33a, after each filling s, the net weight N(i+1) of product metered by the filling means 40 in an instant of time i+1 is given by the difference between the weight P(i+1) detected in such instant of time i+1 and the weight P(i) detected in a previous instant of time i.

Consequently, it is clear that one advantage obtained with the embodiments of the weighing method described here is the possibility to incrementally measure, for each of the containers C, the gross weight, and from here derive the net weight N since the tare weight has been measured, in particular having advantageously performed the weighing of the tare not individually for all the "m" containers C to be weighed, but only once, at the beginning of the weighing cycle and with the same scale 33a. Consequently, in these embodiments m−1 operations of weighing the tare and m−1 movements of the containers C are saved, with considerable advantages in terms of time, less wear of the movement means, less energy consumption and less overheating of the automatic movement systems used.

Another advantage that is obtained, with respect to the state of the art which provides that each scale is provided with its own weighing plate with a single positioning seating to receive a corresponding container to be filled and weighed, is that of achieving greater weighing accuracy. In fact, using a single scale to weigh a plurality of containers C by means of the respective weighing plate 34 prevents the adding up of multiple measurement errors, which could occur, on the other hand, if using multiple scales. It is thus also possible to reduce errors due to the setting of the accuracy threshold of the weighing of the tare for the various scales used. Furthermore, the method described here allow to have fewer measurement errors since fewer measurements are made, with the same number m of containers C to be weighed, and therefore the probability of error is lower. In particular, with the method described here, m+1 measurements are actually carried out for weighing m net weights, also taking into account the weighing of the initial tare, while with the method of the state of the art, 2*m measurements are carried out, implying the weighing of tare and gross weight for each of the m containers.

The present invention therefore provides to weigh, with a single scale 33a and a single operation, the tare of a plurality of containers C at once, thanks to the conformation of the respective weighing plate 34 which has multiple positioning seatings 34a, reducing the risk of introducing errors due to the weighing of the tare for a given group of containers C to be weighed, in particular by means of different scales 33a.

In other words, thanks to the present invention it is possible to carry out the weighing of the tare a smaller number of times, ideally a single time for a given group of containers C and also to use, with respect to the state of the art, a smaller number of scales and, therefore, reduce the possibility of errors in the weighing of the tare introduced by the use of a larger number of scales.

This is especially important for minimal and precise quantities of metered product, as in the pharmaceutical field, since the weighing of the tare is done with a single scale, for several containers at the same time, preventing the propagation of errors that can instead be found in the state of the art, because of a different threshold or setting of the tare between the scales used.

At the same time, with the present invention it is also possible to weigh a greater number of containers C thanks to the fact that it is possible to supply and move at the same time, by means of the extraction gripper 22a or alternatively the support plate 30, a plurality of containers C as described above.

We also wish to point out that, in any case, using the support means, in this specific case the support plate 30, can be optional. In fact, in possible embodiments, the filling and weighing of the containers C can occur directly by using the extraction means 22, in particular the extraction gripper 22a, more particularly by moving the containers C held in position by the extraction gripper 22a in order to place them in cooperation with the filling means 40 or with the weighing means 33.

In the embodiments described here which for example involve the use of extraction means 22 and possible support plate 30 or other pick-up and movement means, the additional advantage of moving a plurality of containers C picked up from the container-holding tray 20 is evident, possibly even all those present therein, by means of the extraction means 22, advantageously provided with the extraction gripper 22a, and moved by means of the support plate 30 or the extraction means 22 themselves. This, in particular, in terms of a reduction in the number of movements of the containers C connected to the weighing operations and therefore an increase in the overall productivity of the processing line 10, lower energy consumption, less overheating and wear of the respective movement means.

In accordance with some embodiments, in order to pick up and move the containers C from the container-holding tray 20, the weighing method comprises:
- supplying a container-holding tray 20 containing a plurality of containers C disposed in an orderly manner, according to a pattern of lines and columns defined by the positioning matrix M1,
- moving, with respect to the container-holding tray 20, the extraction means 22 in the pick-up direction W and, by moving these extraction means 22, picking up, from the container-holding tray 20, at least two containers C disposed on at least one, possibly on at least two parallel and consecutive rows I, II of the positioning matrix M1.

Of these containers C, in the case of picking up from multiple parallel rows, a first container C is positioned in a first row I and a second container C is positioned in a second row II, wherein the first row I is more external, in the positioning matrix M1, with respect to the second row II, with reference to the pick-up direction W.

Picking up and moving such a group of containers C, comprising at least the first container C and the second container C of at least one row or possibly of two parallel and consecutive rows as defined above, allows to speed up the movement and, in general, to reduce the displacements of the containers C between the processing stations, movement times, number of movements, reduce wear, overheating and energy consumption of the movement members and increase the overall productivity of the processing line 10. In fact, in this way a smaller number of movements can be sufficient to pick up, on each occasion, all the containers C disposed in the container-holding tray 20 and transport them to the filling and weighing station 12.

According to the embodiments described here, the container-holding tray 20 and/or the extraction gripper 22a can be moved with respect to each other by respective movement means 39 in order to pick up the plurality of containers C. For example, the extraction gripper 22a can carry out at least a first relative movement of engagement (pick-up direction W, FIGS. 3 and 4) with respect to the container-holding tray 20 in order to engage the at least one part of the group of containers C disposed in the housing seatings 21 of the container-holding tray 20, thus holding the containers C. It is also possible that, alternatively, the container-holding tray 20 is moved in accordance with the first relative movement of engagement with respect to the extraction gripper 22a.

Figure 5:
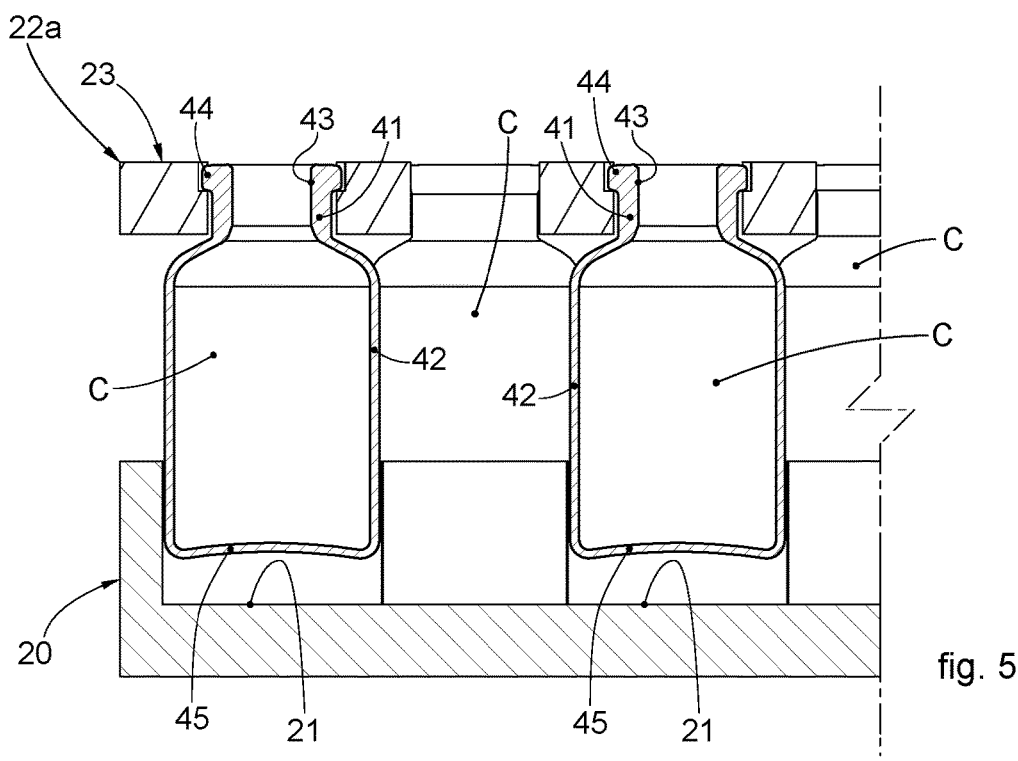
FIG. 5 is a section along line VI-VI of FIG. 4.

Once the containers C are engaged, a second relative movement can be carried out, for example transverse, and in particular orthogonal, to the pick-up direction W, between the extraction gripper 22a and the container-holding tray 20 in order to extract the containers C from the latter. In possible implementations, for example, the extraction gripper 22a can also carry out at least a second relative movement of lifting, transverse, and in particular orthogonal, to the pick-up direction W, with respect to the container-holding tray 20 so as to extract from the container-holding tray 20 the containers C held by the extraction gripper 22a, in order to move them to the next filling and weighing station 12, FIG. 5. Or, alternatively, the extraction gripper 22 can be kept stationary and the container-holding tray 20 can be moved, in particular with a movement of descent transverse, and in particular orthogonal, to the pick-up direction W.

Subsequently, the method described here can provide to move, by means of the extraction gripper 22a, the containers C toward the filling and weighing station 12, in particular toward the support plate 30, if provided, in order to deposit the containers C in the respective support seatings 31 of the support plate 30, FIG. 9, or directly toward the filling means 40 and associated weighing means 33. Then, the filling and weighing can be carried out as described above with reference to FIGS. 8, 9, 10. The support plate 30 is, in any case, conformed in such a way as to allow the filling and weighing of the containers C without these being extracted and/or removed from the support plate 30 itself, with an evident advantage in terms of operating time and with a lower number of movements. As already described above, as an alternative to the support plate 30, it is possible to directly use the extraction gripper 22a, selecting the suitable type of weighing plate 34 shown for example in FIGS. 12, 13, 14.

Also in relation to the weighing operation, carried out before (tare weighing) and after the filling, the support plate 30, if provided, is moved toward the weighing means 33, otherwise the extraction gripper 22a can be used directly.

In the embodiments described here, one or more rows of containers C present in the support plate 30 are aligned with respective scales 33a of the weighing means 33 so that the shaped apertures 32, in correspondence with one or more given rows of containers C to be weighed, are aligned with respective positioning seatings 34a of each weighing plate 34 associated with each scale 33a. If the support plate 30 is used, the support elements 38 of the weighing plate 34, on which the positioning seatings 34a are present, are conformed to cooperate with the shaped apertures 32, therefore the support elements 38 can pass through them, so that the containers C are deposited on the positioning seatings 34a in order to determine the weight of the containers C during the course of the single operation of weighing of the tare as described above and, subsequently, also determine the weight of product metered in them on each occasion with the sequential filling carried out by means of suitable filling means 40, FIG. 9.

When one or more rows of containers C present in the support plate 30 are vertically aligned with respective positioning seatings 34a of the weighing plates 34, the support plate 30 and the weighing plates 34 carry out a movement that brings them close to each other so that the container C are positioned in the positioning seatings 34a, thanks to the presence of the respective shaped apertures 32 of the support plate 30 (FIG. 9) in order to carry out the weighing operation, and a subsequent movement that takes them away from each other so that the support plate 30 is released from the weighing plates 34. In a possible solution, shown in FIGS. 8, 9, 10, the support plate 30 is mobile while the weighing plates 34 are fixed; the support plate 30 moves toward the weighing plates 34 so that the containers C, thanks to the respective shaped apertures 32 of the support plate 30, are positioned in the positioning seatings 34a of a respective weighing plate 34, in order to carry out the weighing operation, and moves away from the weighing plates 34 so as to lift and remove the containers C from the positioning seatings 34a. However, we do not exclude embodiments in which, on the other hand, the weighing plates 34 are vertically mobile to engage the containers C through the shaped apertures 32. In any case, in the embodiments described in which the support plate 30 is used for weighing purposes, the containers C can be partly or completely released from the support plate 30. In the case of complete release, we mean that the lower plane of each container C ends on the upper plane of the support plate 30.

As indicated above, in other embodiments, instead of the support plate 30, the extraction means 22, in particular the extraction gripper 22a, move the containers C toward the filling and weighing station 12 to cooperate with the filling means 40 provided in the filling and weighing station 12, providing to vertically align one or more rows of containers C present in the extraction gripper 22a with the filling means 40. Furthermore, the extraction gripper 22a is also moved toward the weighing means 33 which are associated with the filling and weighing station 12, which in this case comprise one or more scales 33a each equipped with a respective weighing plate 34 according to the embodiments described using FIGS. 12, 13, 14. The weighing means 33 can in fact be essentially aligned or in any case in correspondence with the filling means 40. In this case, it is provided to vertically align one or more rows of containers C present in the extraction gripper 22a with respective weighing means 33 so as to align the containers C with corresponding multiple positioning seatings 34a of each weighing plate 34 present on each scale 33a (FIGS. 12, 13, 14).

Furthermore, we do not exclude that the extraction gripper 22a can be used in combination with the embodiments of scales 33a described with reference to FIGS. 8-11, in particular providing that the containers C can be positioned from above on the respective positioning seatings 34a of the specific weighing plate 34 described in these embodiments.

In the embodiments described here, therefore, the support plate 30, or alternatively the extraction means, in particular the extraction gripper 22a, or possibly other pick-up and movement means provided, move a group of containers C to be filled and weighed with respect to the weighing means 33 provided with the weighing plate 34 which has the multiple positioning seatings 34a. In this case, a number of containers C, disposed for example along one row and advantageously equal to the number of positioning seatings 34a, are positioned there, after which a single operation of weighing the tare is carried out and, subsequently, by means of the filling means 40, the product is progressively metered into each of the containers C, measuring the weight on each occasion, as described above with reference to FIG. 15. The above operations of positioning a group of containers C in the positioning seatings 34a, initial weighing of the tare, progressive filling of each container C of the given group and corresponding weighing of the gross weight in order to calculate, by difference, the net weight of product metered into the specific container C filled, are repeated as many times as the rows of containers C to be weighed, or a submultiple of the number of rows of containers C to be weighed, also based on the number and disposition of the positioning seatings 34a provided on the weighing plate 34 described with reference, for example, to FIGS. 8-14.

Furthermore, we wish to point out that in the embodiments in which, as an alternative to the support plate 30, the extraction means 22, in particular the extraction gripper 22a, are used directly to move the containers C, it is preferable that, for the purposes of the weighing by means of the weighing means 33, the containers C be suitably released from the extraction gripper 22a so as not to distort the weight or transmit vibrations during the weighing step itself; this can be achieved with the particular conformation of the positioning seatings 34a described using FIGS. 12-14. At the end of the filling and weighing operation, it can be provided to transfer the containers C, filled and possibly weighed, from the support plate 30, or from the extraction gripper 22a, to a subsequent processing station 14, as indicated above.

As already described above, we wish to point out in any case that, in possible embodiments, the containers C could be picked up from the container-holding tray 20 by means of other suitable pick-up and movement means, not necessarily configured as the extraction means 22 or the support plate 30, for example by means of vacuum pick-up means or other which, for example, pick up and move the containers C keeping them gripped from above.

Furthermore, according to other embodiments, the weighing method described here can comprise a control or inspection step, by means of optical acquisition means, in particular of images or videos, in order to check for the presence or absence of containers C and/or the correct number of containers C and/or the correct position of the containers C at least with respect to the housing seatings of the weighing plate 34.

For this purpose, at least one suitable optical inspection assembly 60 can be provided (FIGS. 1, 4, 6, 8-10) associated with the filling and weighing station 12, and possibly also with the storage and pick-up station 11, for example comprising a video camera or similar optical or video inspection mean. The optical inspection assembly 60 can be advantageously connected to the command and control unit 50, to which it supplies acquisition signals that are processed to provide feedback on the check carried out; optionally, the command and control unit 50, as a function of the outcome of the check, can supply a signal or warning to an operator, whether an automated, robotized or human operator, to possibly intervene and solve a problem, for example of a possible lack of containers C or incorrect positioning.

The optical inspection assembly 60 can be suitably positioned over a zone of interest to be inspected where there is a group of containers C to be transported, weighed and filled, so that a visual area of the optical inspection assembly 60 can inspect this group of containers C.

In particular, this control or inspection step can be carried out in relation to the containers C picked up by the extraction means (FIG. 4), or to verify the correct transfer of containers C from the extraction means 22 to the support plate 30 (FIG. 6) or also in relation to the disposition of the containers C on the positioning seatings 34a of the weighing plate 34 (FIGS. 8, 9, 10).

For example, according to one possible implementation, this control step by means of the optical inspection assembly 60 can be carried out when the extraction means 22, or other pick-up and movement mean, pick up a group of containers C from the container-holding tray 20 (see FIG. 4). In this case, the control or inspection step can be advantageously aimed at verifying whether or not the extraction means 22 have picked up all the containers C.

Figure 6:
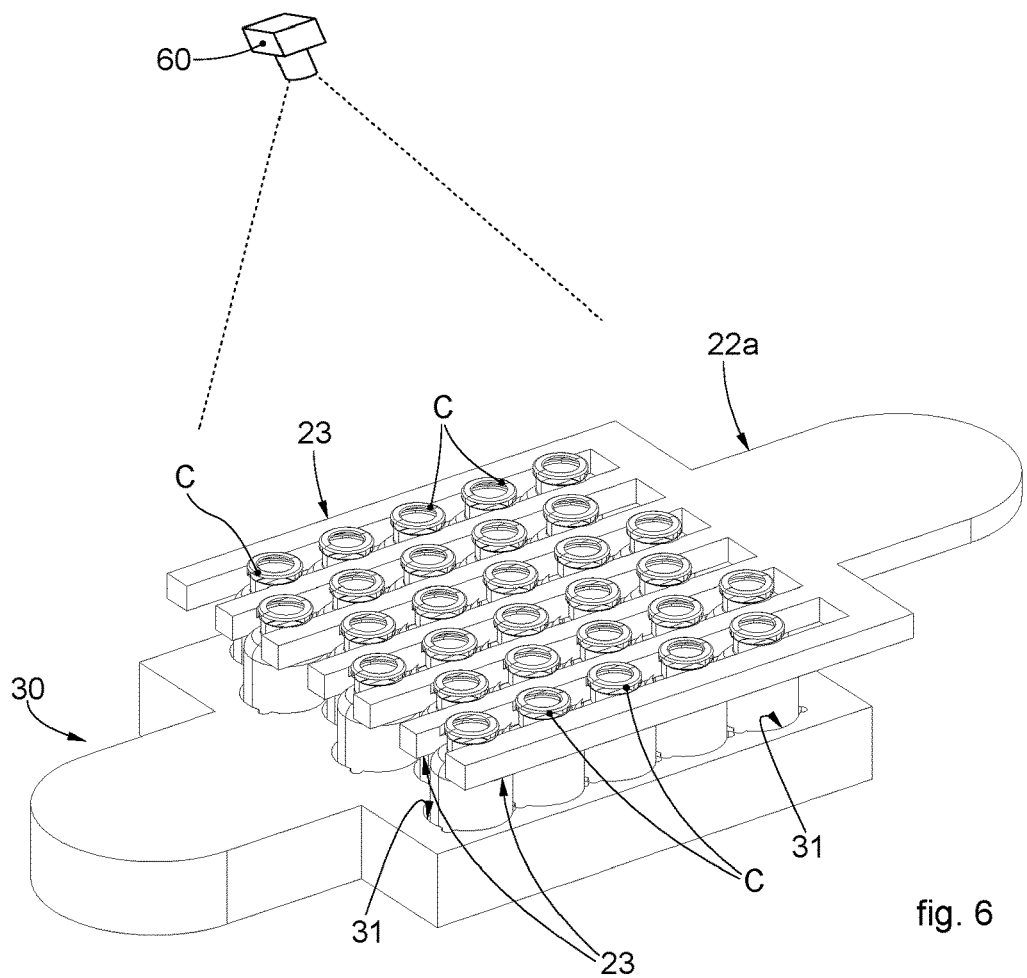
FIG. 6 is a perspective view of a support plate according to some embodiments described here on which containers are positioned, in cooperation with extraction means.

According to another example, which can be combined with the other examples described here, the control or inspection step can be carried out if the containers C are transferred by the extraction means 22 to the support plate 30, also in this case for example to verify the presence of all the containers C (see FIG. 6).

In accordance with yet another example, which can also be combined with the other examples described here, the control or inspection step can be carried out when the extraction means 22, or the support plate 30, or other suitable pick-up and movement mean, position the containers C on the housing seatings 34a of a respective weighing plate 34 of the weighing means 33, in order to check that all the containers C are disposed in the respective positioning seatings 34a (see FIGS. 8, 9, 10). In this case, therefore, it is advantageously possible to check the presence of containers C on the respective housing seatings 34a, in order to verify that no containers C are missing with respect to those picked up. Possibly, in this case, it is also possible to verify the correct positioning of the containers C with respect to the housing seatings 34a, to prevent them from being in an unfavorable position for the weighing and/or filling.

It is clear that modifications and/or additions of steps and/or parts may be made to the method to weigh containers in a processing line, to the filling and weighing station and to the respective processing line as described heretofore, without departing from the field and scope of the present invention as defined by the claims.

It is also clear that, although the present invention has been described with reference to some specific examples, a person of skill in the art shall certainly be able to achieve many other equivalent forms of a method to weigh containers in a processing line, filling and weighing station and respective processing line, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Method to weigh containers in a processing line comprising at least one filling and weighing station provided with a filler and a scale supporting a weighing plate provided with a plurality of positioning seatings, each positioning seatings being configured to receive and support a corresponding container and a support plate provided with through apertures and configured to move said containers with respect to said filler; wherein said weighing plate has a plurality of rods each supporting a support element having an upper surface that defines one respective positioning seating of said plurality of positioning seatings, said support elements being shaped to mate with the apertures of the support plate to pass through said apertures and allow the containers to rest on the respective positioning seatings, wherein the method comprises the following steps:
   picking up a plurality of empty containers from a pick-up station and moving them toward said filling and weighing station;
   positioning each container of said plurality of containers in a respective seating of said plurality of positioning seatings;
   acquiring, by said scale, a measurement of the total tare weight of all containers positioned in the positioning seatings; subsequently:
   sequentially filling each container with a pre-determined dose of product by use of said filler while said plurality of containers remains housed in said positioning seatings of said weighing plate without displacing said containers from the scale after the tare weight measurement,
   acquiring, from the scale the weight of product metered into the first container by subtracting the previously measured total tare weight from the total weight measured at the end of filling said first container; and then
   acquiring, from the scale the weight of product metered into each subsequent container by subtracting from the total weight measured at the end of filling each container, the total weight measured at the end of filling the immediately preceding container.

2. Method as in claim 1, characterized in that in said step of filling sequentially, the weight of each container is determined by a measurement of the difference between the weight detected by said scale at a first filling and said weight of the total tare of said containers initially detected by said scale and, subsequently, by measuring the difference between the weight detected by said scale at another filling and the weight detected by said scale at the immediately previous filling.

3. Method as in claim 1, characterized in that the net weight $N(i+1)$ of product metered into a given container in an instant of time $i+1$ by the filler is defined by the difference between the current weight $P(i+1)$ detected by the scale and the total weight $P(i)$ detected by said scale at a previous filling carried out at the time i:

$$Ni+1=Pi+1-Pi$$

where i is a natural number ranging from 0 to m, and m is the number of containers that are disposed and supported in the positioning seatings of the respective weighing plate associated with said scale.

4. Method as in claim 1, characterized in that said step of picking up is carried out by an automated robotic arm.

5. Method as in claim 1, characterized in that in said step of filling sequentially it is provided to activate said filler to deliver the pre-established dose of product until a pre-established weight measured by said scale is reached, the delivery of product into each container of said containers being interrupted when the pre-established weight is reached.

6. Method as in claim 1, characterized in that said method also comprises:
   supplying a container-holding tray containing said containers disposed in an orderly manner, according to a pattern defined by a positioning matrix,
   moving an extractor relative to said container-holding tray, in a pick-up direction and, by such movement picking up from said container-holding tray at least two containers disposed at least on a row of containers.

7. Method as in claim 6, characterized in that in order to move said containers toward said filling and weighing station and position said containers in the positioning seatings said extractor are used, or a support plate in which said containers have been transferred by said extractor.

8. Method as in claim 1, characterized in that it comprises a control or inspection step, by of optical acquisition, to check the presence or absence of containers and/or the correct number of containers and/or the correct position of said containers at least with respect to the positioning seatings of said weighing plate.

9. Method as in claim 1, characterized in that said method further comprises:
supplying a container-holding tray containing said plurality of containers disposed in an orderly manner, according to a pattern defined by a positioning matrix, and
moving said extractor relative to said container-holding tray in a pick-up direction and, by such movement, picking up from said container-holding tray at least two containers disposed on at least two parallel and consecutive rows of said positioning matrix.

10. Station for filling and weighing containers, comprising:
an extractor configured to pick-up a plurality of empty containers from a pick-up station and move them toward a filling and weighing station; said filling and weighing station comprising:
a scale supporting a weighing plate provided with a plurality of positioning seatings, each positioning seating being configured to receive and support a corresponding container wherein said weighing plate includes a support shank connected to or mounted on the scale and supporting, at one of its ends, a positioning plate in which the plurality of positioning seatings are formed as recessed or hollowed portions, such that the containers can be inserted from above by the extraction means, and
a filler configured to sequentially fill each of said containers with a product while in the filling and weighing station; and
a programmable command and control unit operatively connected to at least said scale and said filler weighing means and to said filling means and configured to:
i) acquire from said scale a measurement of the total tare weight of all containers of said plurality of containers inserted in the positioning seatings,
ii) drive the filler to sequentially fill each of said containers with a pre-established dose of product while the containers remain housed in said positioning seatings of said weighing plate, and
iii) acquire from said scale the weight of product metered into each container by subtracting from the total weight measured at the end of each filling operation from the total weight measured at the immediately preceding filling operation, wherein for the first container filled, the immediately preceding weight corresponds to the total tare weight.

11. The station for filling and weighing containers as in claim 10, characterized in that said extractor can be associated with an automated robotic arm.

12. The station for filling and weighing containers as in claim 10, characterized in that it also comprises an optical inspection assembly configured to check the presence or absence of containers and/or the correct number of containers and/or the correct position of said containers at least with respect to the positioning seatings of said weighing plate.

13. The station for filling and weighing containers as in claim 10, characterized in that the positioning seatings are disposed aligned with each other or are disposed with an offset or alternating spatial configuration known as "quincunx".

14. Station for filling and weighing containers, comprising:
an extractor configured to pick-up a plurality of empty containers from a pick-up station and move them toward a filling and weighing station;
said filling and weighing station comprising:
a scale that supports a weighing plate provided with a plurality of positioning seatings, each positioning seating being configured to receive and support a corresponding container,
a filler configured to sequentially fill each of said containers with a product in said filling and weighing station;
support plate provided with through apertures and configured to move said containers with respect to said filler; wherein said weighing plate has a plurality of rods projecting from a positioning plate and each rod supports a support element having an upper surface that defines one of said positioning seatings, said support elements being shaped to mate with said through apertures of the support plate so as to pass through said apertures and allow the containers to rest on the respective positioning seatings;
a programmable command and control unit operatively connected to at least said scale and said filler, and configured to:
i) acquire, from said scale, a measurement of the total tare weight of all containers of said containers inserted in the positioning seatings,
ii) subsequently, drive the filler to sequentially fill each of said containers with a pre-established dose of product while the containers remain housed in said positioning seatings of said weighing plate, and
iii) subsequently, acquire from said scale, a measurement of the weight of product metered into each container by subtracting the total weight measured at the end of each filling from the total weight measured at the end of immediately preceding filling, wherein for the first container filled, the immediately preceding total weight corresponds to the total tare weight.

* * * * *